United States Patent
Pyzik et al.

(10) Patent No.: US 7,160,627 B2
(45) Date of Patent: Jan. 9, 2007

(54) BORON CONTAINING CERAMIC-ALUMINUM METAL COMPOSITE AND METHOD TO FORM THE COMPOSITE

(75) Inventors: Aleksander J. Pyzik, Midland, MI (US); Uday V. Deshmukh, Oceanside, CA (US); Nicholas M. Shinkel, Bay City, MI (US); Tim L. Allen, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 27 days.

(21) Appl. No.: 10/963,670

(22) Filed: Oct. 13, 2004

(65) Prior Publication Data

US 2005/0081963 A1 Apr. 21, 2005

Related U.S. Application Data

(62) Division of application No. 10/226,785, filed on Aug. 22, 2002, now Pat. No. 6,835,349.

(60) Provisional application No. 60/315,883, filed on Aug. 29, 2001.

(51) Int. Cl.
*C22C 32/00* (2006.01)

(52) U.S. Cl. .................................. 428/539.5

(58) Field of Classification Search ............... 428/545, 428/539.5; 75/244, 249
See application file for complete search history.

(56) References Cited

U.S. PATENT DOCUMENTS

| | | | |
|---|---|---|---|
| 2,746,133 A | 5/1956 | Lowe et al. | 29/182.8 |
| 2,942,970 A | 6/1960 | Goetzel et al. | 75/200 |
| 3,178,807 A | 4/1965 | Bergmann | 29/182.7 |
| 3,364,152 A | 1/1968 | Lipp | 252/478 |
| 3,367,398 A | 2/1968 | Riley et al. | 164/97 |
| 3,431,818 A | 3/1969 | King | 89/36 |
| 3,749,571 A | 7/1973 | Stibbs et al. | 75/204 |
| 4,104,062 A | 8/1978 | Weaver | 75/238 |
| 4,341,823 A | 7/1982 | Sexton et al. | 427/404 |
| 4,544,610 A | 10/1985 | Okamoto et al. | 428/611 |
| 4,605,440 A | 8/1986 | Halverson et al. | 75/238 |
| 4,702,770 A | 10/1987 | Pyzik et al. | 75/236 |
| 4,718,941 A | 1/1988 | Halverson et al. | 75/236 |
| 4,786,467 A | 11/1988 | Skibo et al. | |
| 4,973,522 A | 11/1990 | Jordan et al. | 428/614 |
| 5,020,584 A | 6/1991 | Aghajanian et al. | |
| 5,040,588 A | 8/1991 | Newkirk et al. | 164/97 |
| 5,143,540 A | 9/1992 | Pyzik et al. | 75/233 |
| 5,193,605 A | 3/1993 | Divecha et al. | 164/97 |
| 5,196,238 A | 3/1993 | Pyzik et al. | 427/347 |
| 5,296,417 A | 3/1994 | Claar et al. | 501/87 |
| 5,394,929 A | 3/1995 | Pyzik et al. | 164/97 |
| 5,486,223 A | 1/1996 | Carden | 75/244 |
| 5,500,182 A * | 3/1996 | Roach | 419/45 |
| 5,508,120 A | 4/1996 | Pyzik et al. | 428/688 |
| 5,712,014 A | 1/1998 | Carden | 428/65.6 |
| 5,858,460 A | 1/1999 | Ferrando et al. | 427/217 |
| 5,900,277 A * | 5/1999 | Fox et al. | 427/180 |
| 5,957,251 A * | 9/1999 | Jones et al. | 188/251 R |
| 6,106,588 A | 8/2000 | Skibo et al. | 75/684 |
| 6,200,526 B1 * | 3/2001 | Fox et al. | 419/47 |
| 6,214,284 B1 * | 4/2001 | Soudarev et al. | 264/642 |
| 6,296,045 B1 * | 10/2001 | Fox et al. | 164/98 |

FOREIGN PATENT DOCUMENTS

| | | |
|---|---|---|
| EP | 0 075 648 | 4/1983 |
| EP | 0 340 957 | 11/1989 |
| EP | 0 369 928 | 5/1990 |
| EP | 0 370 940 | 5/1990 |
| GB | 650555 | 2/1951 |
| WO | WO 81/03295 | 11/1981 |
| WO | WO 86/03997 | 7/1986 |
| WO | WO 92/16325 | 10/1992 |

OTHER PUBLICATIONS

"The Effect of Reinforcement Stability on Composition Redistribution in Cast Aluminum Metal Matrix Composites", J. P. Lucas, J. J. Stephens, F. A. Greulich, and Engineering A131 (1991) 221-230, pp. 221-230.

* cited by examiner

Primary Examiner—Ngoclan T. Mai

(57) ABSTRACT

A boron containing ceramic-aluminum metal composite is formed by mixing a boron containing ceramic with a metal powder comprised of aluminum or alloy thereof, shaping the mixture into a porous preform, contacting the preform with an infiltrating metal comprised of aluminum or alloy thereof that melts at a lower temperature than the metal powder and heating to a temperature sufficient to melt the infiltrating metal, but insufficient to melt the metal powder, such that the infiltrating metal infiltrates the porous preform to form the composite. The composite that is formed may be used for vehicular parts.

20 Claims, No Drawings

BORON CONTAINING CERAMIC-ALUMINUM METAL COMPOSITE AND METHOD TO FORM THE COMPOSITE

CROSS-REFERENCE TO RELATED APPLICATION

This application is a divisional of application Ser. No. 10/226,785 filed Aug. 22, 2002 now U.S. Pat. No. 6,835,349.

This application claims the benefit of U.S. Provisional Application Ser. No. 60/315,883, filed Aug. 29, 2001.

FIELD OF THE INVENTION

The invention relates to boron containing ceramic-aluminum metal composites. In particular, the invention relates to boron carbide-aluminum composites.

BACKGROUND OF THE INVENTION

Aluminum-boron carbide (ABC) composites are of interest for components, such as computer hard drive disks, because of their lower density and higher stiffness than aluminum metal. One of the most desirable methods of forming complex shapes of aluminum-boron carbide composites has been to infiltrate a boron carbide preform with aluminum. The infiltration method results in a dense ABC composite having essentially the same geometry and dimensions as the porous preform.

Unfortunately, because aluminum metal has an aluminum oxide layer, infiltration has to be performed at a high temperature (i.e., above 1000° C.). Thus, infiltration has required the use of preforms that are self-supporting. This has precluded the use of substantial amounts of aluminum in the preform. This is because the preform slumps and incompletely infiltrates due to melting of the aluminum in the preform and sintering and reacting with the boron carbide causing the pores to be closed off from the infiltrating metal. Consequently, infiltrated ABC composites have been limited to high boron carbide concentrations (i.e., at least about 40 percent by volume). The lower limit for a self-supporting porous particulate body is generally considered to be 40 percent particulates and the balance pores.

Other techniques have been used to form ABC composites with high aluminum concentrations, such as solid state sintering and high pressure techniques below the melting temperature of aluminum. However, sintering at temperatures below the melting temperature of aluminum suffers from sintering shrinkages resulting in costly machining and, consequently, only making simple shapes economically viable. Similarly, high pressure techniques, such as extruding aluminum and boron carbide, are expensive and limited in the shapes that can be made. In addition, since the aluminum does not melt in these techniques, the bonding between the boron carbide is substantially less compared to when the aluminum melts and reacts with the boron carbide. Consequently, a composite with less than optimal properties is formed by these techniques.

In addition, boron carbide has been cast in molten aluminum, but since boron carbide reacts quickly with molten aluminum and decomposes into boron metal, carbon and water soluble aluminum carbide, the boron carbide is first encapsulated with a protective metal, such as silver. These techniques suffer from the inability to control detrimental phases that reduce strength (e.g., $Al_4C_3$) in the absence of an additional expensive step of coating the boron carbide prior to casting. This protective layer precludes the boron carbide to interfacially bond (react) with the aluminum to make, for example, a stronger composite.

Accordingly, it would be desirable to provide a material and method that overcomes one or more of the problems of the prior art, such as one of those described above.

SUMMARY OF THE INVENTION

A first aspect of the invention is a method of forming a boron containing ceramic-aluminum metal composite comprising, (a) mixing a boron containing ceramic with a metal powder comprised of aluminum or an aluminum alloy, where the boron containing ceramic is reactive with aluminum above the melting temperature of aluminum, (b) shaping the mix of step (a) into a porous preform, (c) contacting the porous preform with an infiltrating metal comprised of aluminum or aluminum alloy having a lower melting temperature than the metal powder, and (d) heating the porous preform and infiltrating metal to an infiltrating temperature sufficient to melt the infiltrating metal but insufficient to melt the metal powder, such that the infiltrating metal infiltrates the porous preform and forms a substantially dense boron containing ceramic-aluminum metal composite.

Surprisingly, the method is capable of producing, for example, a substantially dense near net shape boron carbide-aluminum metal composite below the melting temperature of pure aluminum (i.e., 660° C.) using infiltration. "Substantially dense" means a body that is at least 95 percent of theoretical density. In addition, the method allows improved bonding between, for example, boron carbide and aluminum due to the production of reaction phases between the boron carbide and aluminum in a controlled manner due to the low infiltration temperatures. This in turn allows the production of a novel boron carbide-aluminum body having a high concentration of aluminum that has improved bonding due to the controlled reaction of the lower melting temperature aluminum with boron carbide.

A second aspect of the present invention is a boron containing ceramic-aluminum metal composite having a density of at least about 95 percent of theoretical density and being comprised of at least about 60 percent by volume aluminum metal or alloy thereof, with the boron containing ceramic and at least one reaction product of the boron containing ceramic and aluminum dispersed within the aluminum metal or alloy thereof.

A third aspect of the present invention is a boron containing ceramic-aluminum metal composite having a density of at least about 95 percent of theoretical density and being comprised of at least about 30 percent by volume aluminum metal or alloy thereof, with the boron containing ceramic and at least one reaction product of the boron containing ceramic and aluminum dispersed within the aluminum metal or alloy thereof, with the proviso that at most a trace of $Al_4C_3$ is present in the composite.

The ceramic-metal composite may be used in applications benefiting from properties, such as low density and higher stiffness than aluminum metal. Examples of components include hard drive components (e.g., E-blocks, suspension arms, disks, bearings, actuators, clamps, spindles, base plates and housing covers); brake components (e.g., brake pads, drums, rotors, housings and pistons); aerospace components (e.g., satellite mirrors, housings, control rods, propellers and fan blades); piston engine components (e.g., valves, exhaust and intake manifolds, cam followers, valve springs, fuel injection nozzles, pistons, cam shafts and cylinder liners) and other structural or recreational components (e.g., bicycle frames, robot arms, deep sea buoys, baseball bats, golf clubs, tennis rackets and arrows).

DETAILED DESCRIPTION OF THE INVENTION

Method for Forming the Composite

In forming the boron containing ceramic-aluminum metal (BCAM) composite, a boron containing ceramic is mixed with aluminum or alloy thereof. The boron containing ceramic is reactive with aluminum above the melting temperature of aluminum. Suitable boron containing ceramics include, for example, boron carbide, aluminum boron carbides (e.g., $Al_4BC$, $Al_3B_{48}C_2$ and $AlB_{24}C_4$) and metal borides ($TiB_2$, $AlB_2$, $AlB_{12}$, $SiB_6$, $SiB_4$, and $ZrB$) and mixtures thereof. Preferably, the boron containing ceramic is boron carbide and titanium diboride. Most preferably, the boron containing ceramic is boron carbide.

The boron containing ceramic may be any morphology (e.g., particulates, whiskers or fibers), any size and size distribution suitable to form a porous preform that may be infiltrated. Generally, the boron containing ceramic is comprised of particulates between 0.1 to 150 micrometers. Preferably, the particles are at least 0.2 and more preferably at least about 0.5 micrometer to at most about 100 micrometers and more preferably at most about 50 micrometers.

The metal powder of aluminum or aluminum metal alloy may be any suitable alloy so long as the powder fails to melt at a temperature sufficient to infiltrate the infiltrating metal. Since the metal powder and infiltrating metal are comprised of aluminum, they generally will at least partially form an alloy of aluminum upon infiltration. Preferably, they will form a homogeneous aluminum alloy upon infiltration.

The metal powder may also be any morphology, size and size distribution suitable to form the porous preform. The particular metal powder selected will be dependent on the final BCAM microstructure desired. For example, BCAM composites having more uniform microstructures are typically produced when the average particle size of the boron carbide is larger or equal to the size of the metal powder. Whereas, metal powders having an average particle size larger than the boron carbide generally form BCAM composites with distinctive bi-modal microstructures. This is believed to be caused by the formation of pools of molten aluminum that tend to result in the growth of large binary and ternary AlBC phases. Generally, the larger the metal particles are relative to the boron carbide particles, the larger the reactive product ceramic grains are after infiltration and reaction is completed. Finally, mixtures of several metal powder sizes generally produce unique networks of larger and smaller, in situ formed, reaction phases.

Generally, the particle size of the metal powder is from about 1 micrometer to about 500 micrometers. Preferably, the particle size of the metal powder is at least about 10 micrometers, more preferably at least about 15 micrometers and most preferably at least about 25 micrometers to preferably at most about 300 micrometers, more preferably at most about 150 micrometers and most preferably at most about micrometers.

The amount of metal powder should be an amount sufficient to allow the infiltrating metal to infiltrate and form a substantially dense composite. The amount of metal powder generally is at least about 10 percent by volume to at most about 99 percent by volume of the solids in the mixture (e.g., solids do not include organics that are solid at room temperature, for example "waxes," which are subsequently removed before infiltrating). Preferably, the amount of metal powder is at least about 15 percent, more preferably at least about 20 percent and most preferably at least about 25 percent to preferably at most about 40 percent, more preferably at most about 80 percent and most preferably at most about 70 percent.

The metal powder may be aluminum or alloy thereof, so long as the melting temperature is sufficiently higher than the infiltrating metal to allow formation of a substantially dense composite. Suitable aluminum alloys include those known in the art, such as those described by 16.80–16.98 of *Eschbach's Handbook of Engineering Fundamentals 4$^{th}$ Edition*, Ed. B. D. Tapley, John Wiley & Sons, Inc. NY, 1990. Specific examples of alloys include alloys of aluminum that contain one or more of Cu, Mg, Si, Mn, Cr and Zn. Exemplary aluminum alloys include Al—Cu, Al—Mg, Al—Si, Al—Mn—Mg and Al—Cu—Mg—Cr—Zn. Specific examples of aluminum alloys include 6061 alloy, 7075 alloy and 1350 alloy, each available from the Aluminum Company of America, Pittsburgh, Pa.

The mixing method may be any suitable method, such as those known in the art. Examples of suitable methods include ball milling, attrition milling, ribbon blending, vertical screw mixing, V-blending and fluidized zone mixing. Ball milling in a solvent, such as ethanol, heptane, methanol, acetone and other low molecular weight organic solvents with milling media, such as alumina and boron carbide media, generally provides satisfactory results. Other additives useful in the formation of the porous body from the mixture may be included, such as dispersants, binders and lubricants.

Any suitable method for shaping the mixture may be used to form the porous preform. Suitable shaping methods include, for example, slip or pressure casting, pressing and plastic forming methods (e.g., jiggering, injection molding and extrusion). The forming of the porous body may include removing, if necessary, solvent and organic additives, such as dispersants, lubricants and binders after shaping of the mixture. Each of the above methods and steps are described in more detail in *Introduction to the Principles of Ceramic Processing*, J. Reed, J. Wiley and Sons, N.Y., 1988.

After removal of any organic additives or processing aids, the porous preform may be any density that is still capable of forming the ceramic-metal composite, but is generally limited to at least 40 percent of theoretical density (i.e., 60 percent porosity by volume) to 85 percent of theoretical density (i.e., 15 percent porosity by volume). The lower limit occurs because bodies with much greater porosity will not be self supporting. The upper limit is when a substantial amount of the pores become closed off and cannot be infiltrated. Preferably, the density of the porous body is at least about 45 percent, more preferably at least about 50 percent, most preferably at least about 60 percent to preferably at most about 80 percent and more preferably at most about 75 percent of theoretical density.

The preform is contacted with an infiltrating metal that is aluminum or alloy thereof. The aluminum or alloy is selected depending on the metal powder incorporated into the porous preform (i.e., must have a sufficiently lower melting temperature to form a substantially dense composite). The infiltrating metal may be any suitable metal, such as those described for the metal powder. The infiltrating metal may be contacted in any suitable manner, such as placing it upon the preform or placing it in powder form in a refractory crucible and placing the preform on top of the infiltrating metal powder.

The porous preform contacted by the infiltrating metal is heated to an infiltrating temperature sufficient to melt the infiltrating metal, but insufficient to melt the metal powder incorporated into the preform for a time to form a substantially dense boron containing ceramic-aluminum metal composite. Generally, the infiltrating temperature is at least about 10° C. below where melting of the metal powder occurs. Preferably, the infiltrating temperature is at least about 20° C., more preferably at least about 30° and most preferably at least about 40° C. below where melting of the metal powder occurs.

It is important to note that melting of the powder may be above the melting temperature of the pure aluminum or pure alloy comprising the powder, due to the oxide layer on the particles. That is to say, if the oxide layer is sufficiently thick, the infiltrating temperature may be above the melting temperature of a non-oxidized metal powder (i.e., pure metal). This is so, because the oxide layer may retain the shape of the particles and inhibit flow due to melting of the metal. Generally, infiltrating temperatures exceeding the melting temperature of the pure metal of the metal particles are useful for smaller parts. Larger parts, generally, cannot be heated to these higher infiltrating temperatures because of longer infiltration times and greater stresses that can cause slumping due to rupturing of the oxide layers and flow of the metal in the metal particles. If desired, the aluminum powder may be treated to optimize the oxide layer, such as heating the powder in an oxygen atmosphere prior to mixing.

The infiltrating temperature is dependent on the metal powder and infiltrating metal used, but, generally, is at most about 730° C. Preferably, the infiltrating temperature is at most 700° C., more preferably at most about 660° C. (about the melting temperature of pure aluminum) and most preferably at most about 640° C. It is also preferable that the infiltrating temperature is below the melting temperature of the metal powder without a metal oxide layer (i.e., pure metal). Preferably, the infiltrating temperature is at least about 10° C., more preferably at least about 20° and most preferably at least about 40° C. below the melting temperature of the pure metal of the metal powder used. The time at the infiltrating temperature may be any suitable time to form the composite. Generally, the time is from about a minute to 24 hours. Preferably, the time is several minutes to several hours.

Heating may be performed under any suitable atmosphere. For example, heating may be performed in inert atmospheres (e.g., noble gases or mixtures thereof) at atmospheric pressures or under vacuum. Preferably, the heating is performed under vacuum or inert atmospheres at a pressure less than or equal to atmospheric pressure. More preferably, the heating is performed under a vacuum.

It has also been discovered that after forming the substantially dense BCAM composite, the BCAM composite may be further heated to a temperature exceeding the melt temperature of the metal powder without slumping or distortion of the dense BCAM composite. This further heat treatment improves the bonding (reaction) between the starting ceramic and aluminum metal in the composite, increasing, for example, the strength of the BCAM composite. However, this further heat treatment temperature must not be so great or for an extended time that the BCAM composite distorts or slumps or the ceramic decomposes or forms deleterious phases (e.g., aluminum carbide). Thus, it should be understood that this further heat-treatment temperature may be substantially higher than the melting temperature of the metal powder, so long as the time is short. For example, if the heat treatment is to a temperature of 1025° C., the time must be very short, such as less than about 10 minutes. In contrast, if the temperature is just above where the pure metal of the metal powder begins to melt, the time at temperature may be for several hours.

The BCAM Composite

To reiterate, the BCAM composite that is formed by the method is substantially dense, which means it is at least 95 percent of theoretical density. Preferably, the composite is at least about 97 percent, more preferably at least about 98 percent, even more preferably at least about 99 percent and most preferably essentially 100 percent of theoretical density.

The BCAM is comprised of a metal matrix that is an aluminum alloy with a boron containing ceramic (starting ceramic powder used to make the preform) and at least one reaction phase that is a reaction product of the boron containing ceramic and aluminum. As an illustration, when the boron containing ceramic is boron carbide, the composite will contain boron carbide, aluminum alloy and a reaction phase, such as $AlB_2$, $Al_4BC$, $Al_3B_{48}C_2$, $AlB_{12}$, $Al_4C_3$ and $AlB_{24}C_4$. In this embodiment, $Al_4C_3$ is preferably present in at most a trace amount and more preferably not at all.

The amount of metal in the BCAM composite is at least about 30 percent by volume to at most about 98 percent by volume when there is at most a trace amount of $Al_4C_3$. Preferably, the amount of metal is at least about 40 percent, more preferably at least about 50 percent and most preferably at least about 60 percent to preferably at most about 95 percent, more preferably at most about 90 percent and most preferably at most about 85 percent by volume of the composite. The balance of the composite is the initial boron containing ceramic phase and the reaction product.

The amount of metal in the BCAM composite is at least about 60 percent by volume to at most about 98 percent by volume when there is more than a trace amount of $Al_4C_3$. Preferably, the amount of metal is at least about 65 percent, more preferably at least about 70 percent and most preferably at least about 75 percent to preferably at most about 95 percent, more preferably at most about 90 percent and most preferably at most about 85 percent by volume of the composite. The balance of the composite is the initial boron containing ceramic phase and the reaction product.

It is preferred that at least 10 percent by volume of the boron containing ceramic used to make the porous preform is present in the BCAM composite. That is to say, at least 10 percent of the boron containing ceramic has not reacted to form the reaction product. Preferably, at least 50 percent, more preferably at least 75 percent, even more preferably at least 80 percent and most preferably at least 85 percent by volume to preferably at most about 99 percent of the boron containing ceramic is present in the BCAM composite. That is to say, the amount of ceramic (i.e., boron containing ceramic and reaction product) in the composite is comprised of at least 10 percent by volume of the boron containing ceramic.

The boron containing ceramic-aluminum metal composite of the present invention has improved bonding resulting in a composite that is both light weight and stiffer than aluminum, while retaining much, if not all, of the toughness of aluminum. Because of this, the composite is particularly useful for vehicular parts. "Vehicular" means any motorized wheeled transportation device, such as a bicycle, motorcycle, automobile, truck, bus, airplane and train. Parts include but are not limited to brake part, suspension part, body part, steering part, wheel rim, engine part, coolant or heating system part, air conditioning part, fuel part, exhaust part, transmission part, clutch part or drive axle part.

EXAMPLES

For each of the examples, the strength was determined using MIL-STD-1942b standard. The hardness was determined using Vickers indentation. The Young's modulus was determined by using a digital oscilloscope, Tektronix model 2430A, Tektronix Inc., Beaverton, Oreg. The density was determined by Autopycnometer 1320, Fisher Scientific, Pittsburgh, Pa. The phases present in the composite were determined by x-ray diffraction using an x-ray diffractometer using $CuK_{alpha}$ radiation and a scan rate of 2 degrees per minute.

Example 1

Fifty parts by weight of boron carbide ($B_4C$, obtained from Electrosmeltzwerk Kempton "ESK", Kempton, Germany, were dry mixed with 50 parts by weight of a high purity aluminum powder (Series 1100, Alcoa, Pittsburgh, Pa.). The boron carbide had an average particle size of about 10 micrometers. The aluminum powder had an average particle size of about 40 micrometers. The aluminum powder had a melt temperature of about 660° C. The mixed powders were pressed in one-inch diameter die to form a porous preform having a density of about 50 percent of theoretical. The preform was placed in an alumina crucible. Solid pieces of 6061 aluminum alloy (available from Alcoa, Pittsburgh, Pa.) were placed on top of the preform. The 6061 aluminum alloy melts from about 580° to 610° C. The crucible was heated to 620° C. for 15 minutes and cooled. The resultant composite had a density greater than 98 percent of theoretical density. The composite contained, by volume, about 73 percent aluminum alloy, 23 percent boron carbide and 4 percent reaction phases of aluminum boron carbides. The composite had a strength of 220 MPa, hardness of 350 $Kg/mm^2$ and elastic modulus (Young's modulus) of 65 GPa.

Example 2

A composite was prepared in the same manner as in Example 1, except that after heating to 620° C. the temperature was increased to 640° C. for 1 hour prior to cooling. The composite had a density of at least 98 percent of theoretical density. The composite contained, by volume, 65 percent aluminum alloy, 20 percent boron carbide and 15 percent aluminum boron carbide phases. The composite had a strength of 200 MPa, hardness of 500 $Kg/mm^2$ and Young's modulus of 70 GPa.

Example 3

A composite was prepared in the same manner as in Example 2, except that after heating to 640° C. the furnace was heated to 1025° C. for 5 minutes prior to cooling. The composite had a density of at least 98 percent of theoretical density. The composite contained, by volume, about 67 percent by volume aluminum alloy, 16 percent boron carbide and 17 percent aluminum boron carbide phases. The composite had a strength of 450 MPa, hardness of about 550 $Kg/mm^2$ and Young's modulus of about 150 GPa.

Comparative Example 1

A preform was made in the same manner as Example 1, except the preform was made solely from the boron carbide powder (i.e., no metal powder). The preform was placed in an alumina crucible and the same aluminum alloy placed on top of the preform as in Example 1. The heating was also the same as in Example 1. The preform was not infiltrated by the aluminum alloy.

What is claimed is:

1. A boron containing ceramic-aluminum metal composite having a density of at least 95 percent of theoretical density and being comprised of at least 60 percent by volume aluminum metal or alloy thereof, and a ceramic selected from the group consisting of $TiB_2$, $B_4C$, $SiB_6$, $SiB_4$, ZrB and combination thereof and at least one reaction product of the ceramic and aluminum, the ceramic and reaction product being dispersed within the aluminum metal or alloy thereof, wherein the ceramic is present in the composite in an amount of at least 10 percent by volume of the total amount of the ceramic and reaction product present in the composite.

2. The boron containing ceramic aluminum metal composite of claim 1 wherein the composite is comprised of at least 70 percent by volume aluminum or alloy thereof.

3. The composite of claim 1 wherein the ceramic is boron carbide and the reaction product is comprised of $AlB_2$, $Al_4BC$, $Al_3B_{48}C_2$, $AlB_{12}$, $Al_4C_3$, $AlB_{24}C_4$ or mixtures thereof.

4. The composite of claim 3 wherein the reaction product is $AlB_2$, $Al_{4B}C$, $Al_3B_{48}C_2$, $AlB_{12}$, $AlB_{24}C_4$ or mixtures thereof.

5. The composite of claim 1 wherein the amount of the ceramic is at least 50 percent by volume of the total amount of the ceramic and reaction product present in the composite.

6. The composite of claim 5 wherein the amount of the ceramic is at least 75 percent by volume of the total amount of the ceramic and reaction product present in the composite.

7. A vehicular part comprised of the composite of claim 1.

8. The part of claim 7 wherein the vehicular part is a brake part, suspension part, body part, steering part, wheel rim, engine part, coolant or heating system part, air conditioning part, fuel part, exhaust part, transmission part, clutch part or drive axle part.

9. The composite of claim 1, wherein the ceramic is $TiB_2$, $SiB_6$, $SiB_4$, ZrB or mixture thereof.

10. The composite of claim 1, wherein the ceramic is $TiB_2$.

11. The composite of claim 1, wherein the ceramic is boron carbide.

12. A boron containing ceramic-aluminum metal composite having a density of at least about 95 percent of theoretical density and being comprised of at least about 30 percent by volume aluminum metal or alloy thereof and a ceramic selected from the group consisting of boron carbide, an aluminum boron carbide and combination thereof and a reaction product of the ceramic and aluminum with the ceramic and reaction product being dispersed within the aluminum metal or alloy thereof and with the proviso that at most a trace of $Al_4C_3$ is present in the composite wherein the amount of the ceramic is at least 50 percent by volume of the total amount of the ceramic and reaction product present in the composite.

13. The composite of claim 12 wherein the reaction product is $AlB_2$, $Al_4BC$, $Al_3B_{48}C_2$, $AlB_{12}$, $AlB_{24}C_4$ or mixtures thereof.

14. The composite of claim 12 wherein the amount of the ceramic is at least 75 percent by volume of the total amount of the ceramic and reaction product present in the composite.

15. A vehicular part comprised of the composite of claim 12.

16. The part of claim 15 wherein the vehicular part is a brake part, suspension part, body part, steering part, wheel rim, engine part, coolant or heating system part, air conditioning part, fuel part, exhaust part, transmission part, clutch part or drive axle part.

17. The composite of claim 12, wherein there is no $Al_4C$.

18. The composite of claim 12 wherein the ceramic is $B_4C$.

19. The composite of claim 17, wherein the ceramic is $B_4C$.

20. The composite of claim 14, wherein the ceramic is $B_4C$.

* * * * *